(12) United States Patent
Minor

(10) Patent No.: US 7,232,017 B2
(45) Date of Patent: Jun. 19, 2007

(54) POLE VIBRATION DAMPING ASSEMBLY AND METHOD

(75) Inventor: Ray C. Minor, Abingdon, VA (US)

(73) Assignee: Kearney-National Inc., Abingdon, VA (US)

( * ) Notice: Subject to any disclaimer, the term of this patent is extended or adjusted under 35 U.S.C. 154(b) by 0 days.

(21) Appl. No.: 10/814,331

(22) Filed: Apr. 1, 2004

(65) Prior Publication Data

US 2005/0217955 A1   Oct. 6, 2005

(51) Int. Cl.
*F16F 7/10* (2006.01)
*F16M 1/00* (2006.01)

(52) U.S. Cl. .................. 188/378; 267/136; 174/42; 74/574.2

(58) Field of Classification Search ........ 188/378–381; 267/140.11, 140.12, 140.13, 141.2, 136; 174/42; 74/574, 574.2; 248/562, 636
See application file for complete search history.

(56) References Cited

U.S. PATENT DOCUMENTS

| | | | |
|---|---|---|---|
| 2,195,041 A * | 3/1940 | Von Schlippe .............. | 188/268 |
| 2,714,161 A * | 7/1955 | Featherstun ................. | 188/378 |
| 3,174,589 A | 3/1965 | Chen | |
| 3,245,177 A | 4/1966 | Chen | |
| 3,259,212 A | 7/1966 | Nishioka et al. | |
| 3,382,629 A | 5/1968 | Reutlinger | |
| 3,568,803 A | 3/1971 | See et al. | |
| 3,612,222 A * | 10/1971 | Minor ......................... | 188/379 |
| 4,130,185 A * | 12/1978 | Densmore ................... | 188/378 |
| 4,350,233 A | 9/1982 | Buckley | |
| 4,433,592 A * | 2/1984 | Tatsumi et al. ........... | 74/573 F |
| 4,640,216 A | 2/1987 | Lehmann et al. | |
| 4,655,317 A * | 4/1987 | Kolya et al. ................ | 181/257 |
| 4,711,610 A * | 12/1987 | Riehl .......................... | 409/141 |
| 4,736,701 A | 4/1988 | Kondo et al. | |
| 5,593,144 A | 1/1997 | Hamada et al. | |
| 5,682,069 A | 10/1997 | Phillips et al. | |
| 5,724,862 A * | 3/1998 | Hannah et al. ........... | 74/573 R |
| 5,896,961 A | 4/1999 | Aida et al. | |
| 6,035,981 A | 3/2000 | Kemeny | |
| 6,234,286 B1 | 5/2001 | Feldberg | |

* cited by examiner

Primary Examiner—Melody M. Burch
(74) Attorney, Agent, or Firm—Jacobson Holman PLLC

(57) ABSTRACT

A pole vibration damping means includes an annular housing with internal radial pole encircling chambers in which lead spheres are provided for effecting damping of first mode harmonic vibrations with the assembly being attached to the upper end portion of the pole and operating in conjunction with a pole vibration damping device mounted medially for damping second harmonic mode vibrations.

11 Claims, 6 Drawing Sheets

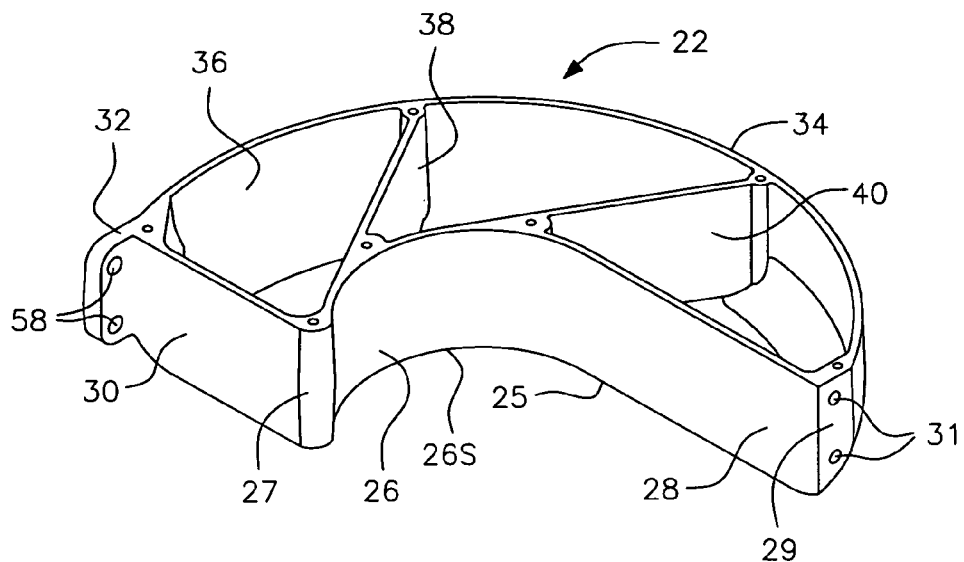
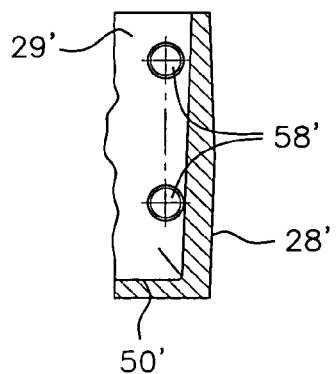
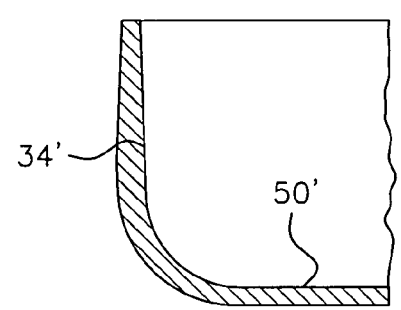
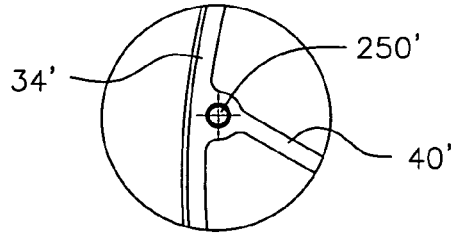
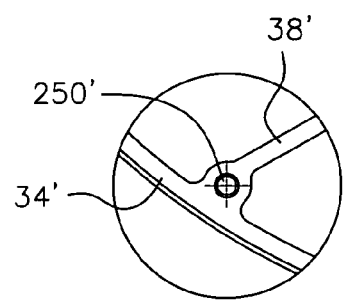

POLE VIBRATION DAMPING ASSEMBLY AND METHOD

BACKGROUND OF THE INVENTION

1. Field of the Invention

The present invention relates to a vibration damping apparatus and methods. More specifically, the invention relates to vibration damping apparatus and methods for reducing wind induced vibration of light poles, flag poles and the like.

Light poles and similar devices are subject to wind induced vibrations which can result in costly and hazardous failures of such structures. Many parameters including pole geometry and materials, wind speed, wind gust frequency and velocity are involved in effecting pole vibration. For many years those of skill in the art were of the belief that second harmonic mode vibrations were solely responsible for structural failures of poles and vibration dampers such as that shown in applicant's U.S. Pat. No. 3,612,222 were designed so as to reduce second harmonic mode vibration. Second harmonic mode vibration of poles is generally considered to be of approximately four cycles of vibration per second. However, within recent years a number of pole failures have occurred which were not caused by second harmonic mode vibrations but were resultant from first harmonic mode vibrations which occurred at a frequency of approximately one vibration cycle per second.

The present invention in one aspect is directed to vibration dampers for poles capable of reducing first mode natural frequency vibrations.

2. Related Art

The prior art is replete with devices and methods intended to reduce pole vibration as exemplified by the following discussed prior art patents.

Applicant's earlier U.S. Pat. No. 3,612,222 discloses a pole-mounted second mode natural frequency vibration damping assembly employing a metal rod loosely fitted in a tubular member attached to the pole.

Feldberg U.S. Pat. No. 6,234,286 purports to be an improvement over applicant's earlier U.S. Pat. No. 3,612,222 with respect to which it differs only in a minor manner relating to the attachment of the device to a pole.

Kemeny U.S. Pat. No. 6,035,981 discloses a complicated broadband passive mass damper intended for use on machinery or other equipment.

Aida et al. U.S. Pat. No. 5,896,961 discloses a dynamic vibration absorber mounted on a light pole by a variety of magnetic devices.

Phillips et al. U.S. Pat. No. 5,682,069 discloses a vibration damping assembly mounted on a strut about which the device surrounds.

Hamada et al. U.S. Pat. No. 5,593,144 discloses a vibration damping device mounted on a drive shaft.

Knodo et al. U.S. Pat. No. 4,736,701 discloses a variety of devices for attachment to the upper end of a mast.

Lehmann et al. U.S. Pat. No. 4,640,216 is directed to a vibration damping assembly for a periscope.

Buckley U.S. Pat. No. 4,350,233 discloses a vibration damping device provided internally of a pole or the like effecting first harmonic mode vibration damping.

Reed U.S. Pat. No. 3,568,803 discloses a vibration damping device attached to the upper end of a mast.

Reutlinger U.S. Pat. No. 3,382,629 discloses a vibration damping assembly attached to a mast or pole.

Nishioka et al. U.S. Pat. No. 3,259,212 discloses a pole vibration damping device mounted on the outer end of a curved pole.

Chen U.S. Pat. No. 3,245,177 is directed to a vibration damping device for reducing vibrations of a chimney or the like by the use of porous, loose fill material and liquid.

Chen U.S. Pat. No. 3,174,589 is similar to the above-noted U.S. Pat. No. 3,245,177.

SUMMARY OF THE INVENTION

The primary object of the present invention is the provision of pole vibration dampers for reducing first harmonic mode vibrations.

A further object of the present invention is the provision of pole first mode vibration dampers capable of operating in conjunction with second harmonic mode vibration dampers of the same pole.

The present invention achieves the foregoing objects by the provision of an annular hollow housing having an axially positioned cylindrical opening dimensioned to matingly fit over a pole upper end portion. The annular housing has a an annular interior chamber which is divided into a plurality of discreet chambers extending about the entire periphery of the housing with each chamber enclosing a single spherical lead weight. The weights act in harmony to reduce first mode harmonic vibration. The first mode harmonic vibration damper acts in conjunction with a second mode vibration damper provided in the mid-portion of the pole so as to reduce vibration and preclude structural failure caused by either first or second mode vibration.

Other objects, features and advantages of the present invention will be apparent to those skilled in the art upon a reading of this specification including the accompanying drawings.

BRIEF DESCRIPTION OF THE DRAWINGS

The invention is better understood by reference to the following Detailed Description of the Preferred Embodiments with reference to the accompanying drawing figures, in which like reference numerals refer to like elements throughout, and in which:

FIG. 2 is a perspective view of a of a first half-portion housing component of the first harmonic mode vibration damper apparatus;

FIG. 7 is a sectional view taken along line 7—7 of FIG. 3;

FIG. 8 is a sectional view taken along line 8—8 of FIG. 3;

FIG. 9 is an enlarged view of the encircled portion 9 in FIG. 3;

FIG. 10 is an enlarged view of the encircled portion 10 in FIG. 3;

DETAILED DESCRIPTION OF THE PREFERRED EMBODIMENTS

Figure 1:
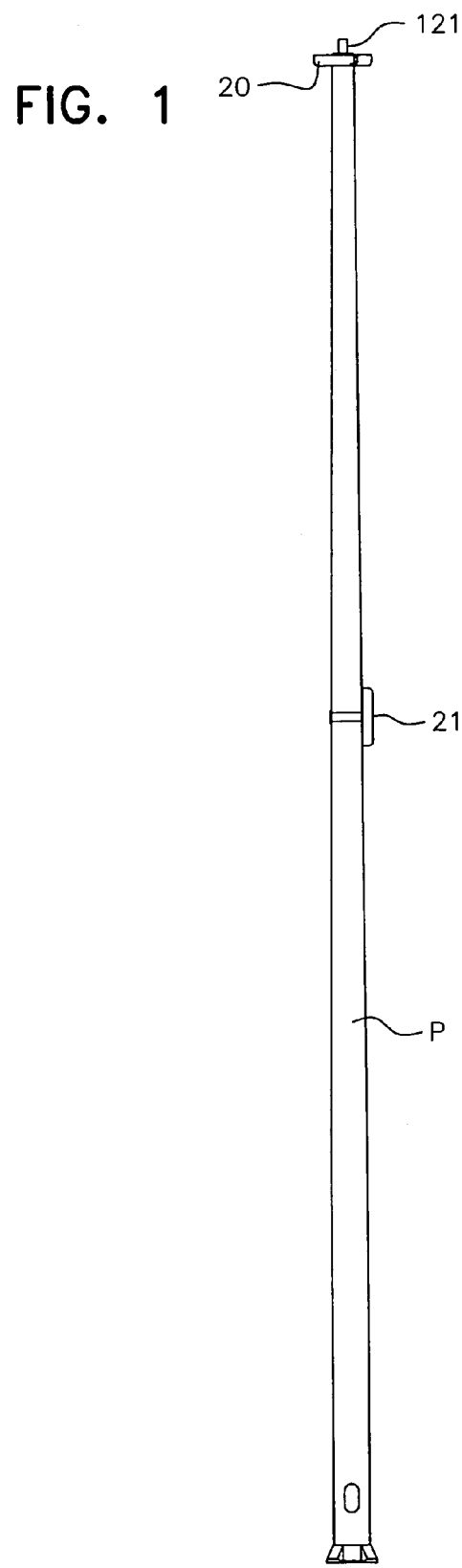
FIG. 1 is a front elevation view of a light pole on which the preferred embodiment first harmonic mode vibration damper apparatus is positioned.

In describing the following embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

The preferred embodiment of the invention comprises a first harmonic mode vibration damper apparatus 20, which in use is mounted on a pole P in an upper position thereof as shown in FIG. 1. It should be noted that the first harmonic mode vibration damper apparatus 20 is mounted at the upper end of pole P adjacent a mounting fitting in the form of a pipe 121 or the like of conventional construction and to which a light or other device is conventionally mounted when the pole is in use. It should also be noted that a conventional second harmonic mode vibration damper 21 of the type disclosed in U.S. Pat. No. 3,612,222 is mounted in the mid-portion of pole P.

Figure 16:
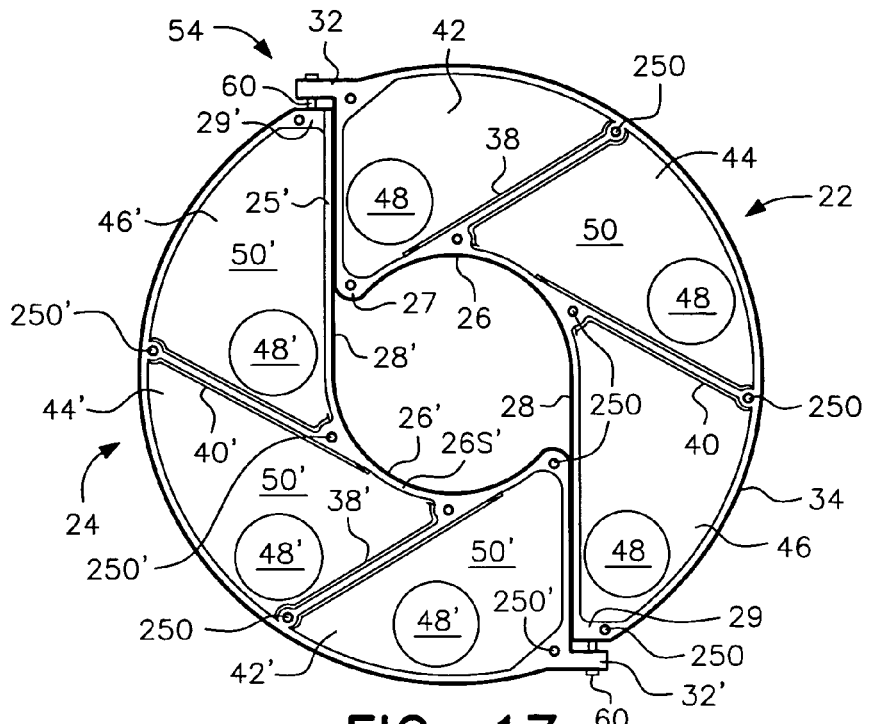
FIG. 16 is a top plan view of the preferred embodiment first harmonic mode vibration damper with the top cover components removed.
Figure 17:
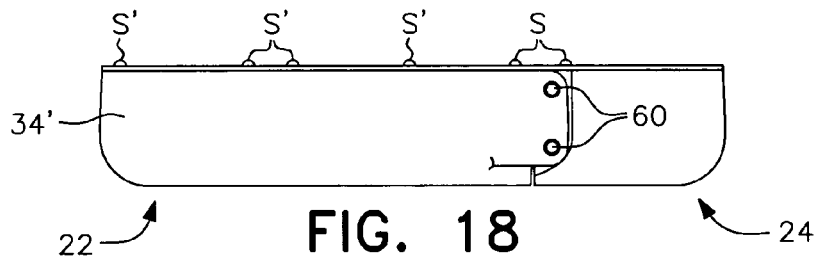
FIG. 17 is a front elevation view of the preferred embodiment of FIG. 16.
Figure 18:
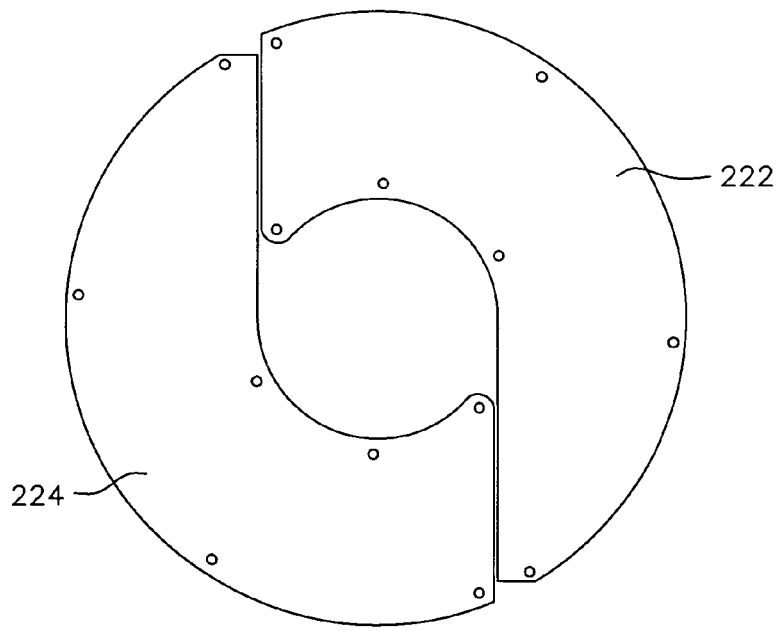
FIG. 18 is a top plan view of the preferred embodiment of FIG. 16 with the top cover components in position.
Figure 19:
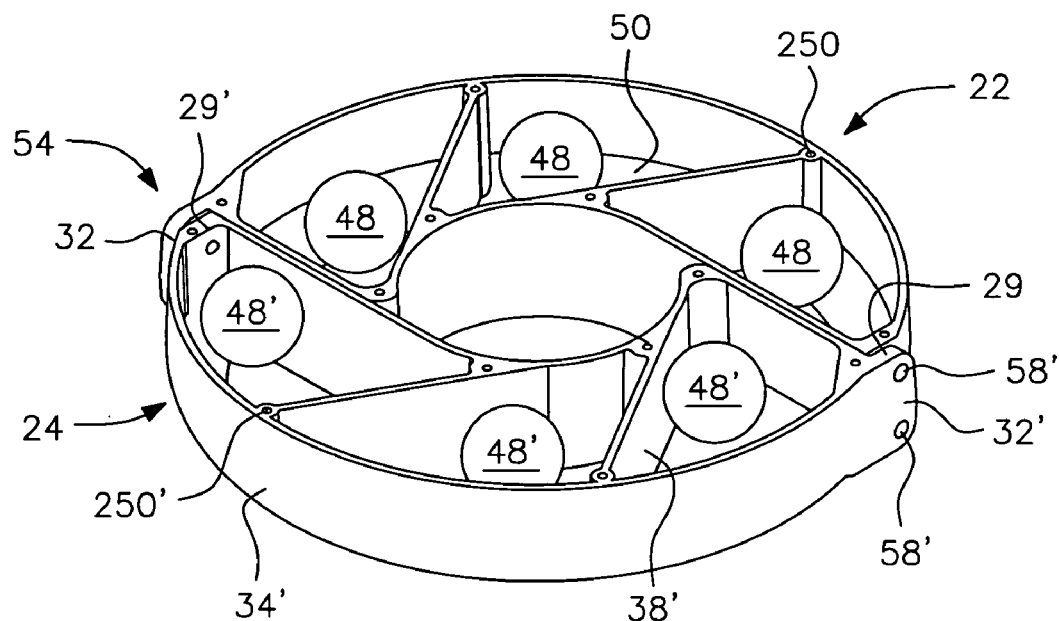
FIG. 19 is a perspective view of the preferred embodiment with the cover components removed.
Figure 20:
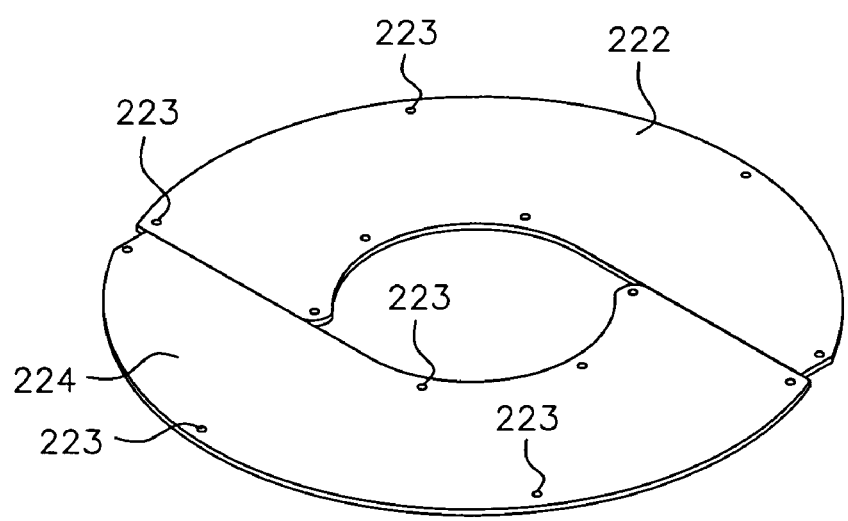
FIG. 20 is a perspective view of the cover components.

The primary components of the first harmonic mode vibration damper apparatus 20 comprise first and second housing component half-portions 22 and 24 respectively each of which is identical to the other and is formed of cast aluminum. The first housing component half-portion 22 and second housing component half-portion 24 are identical and are associated together to form a unitary housing structure 54 as shown in FIGS. 16 and 19. The first housing component half-portion 22 will be described in detail and it should be understood that such description is equally applicable to the second housing component half-portion 24. The numerical designators applied to second housing component half-portion 24 in the drawings correspond to those of first housing component half-portion 22 but have a prime mark (') added are-primed for the sake of clarity.

First housing component half-portion 22 has a vertical height of three (3) inches and includes an inner partial cylinder sleeve surface 26 (FIG. 2) of an inner partial cylinder sleeve 26S having a center of curvature C and a radius of three (3) inches. Surface 26 blends into an inner planar surface 28 of a first planar panel plate 25 having an outer end terminating at a first outer connector lug 29 having threaded bore openings 31 as shown in FIG. 2. The opposite end of the inner partial cylinder surface 26 terminates at an inner juncture lug 27 connected to the inner end of a second planar panel plate 30. The outer end of the second planar panel plate 30 terminates in a second outer connector lug 32 which has smooth bore holes 58 usable for connecting the first housing component half-portion 22 to the connector lug 29' of second housing component half-portion 24. Second outer connector is also connected to one end of an outer partial cylinder outer sleeve 34 having an inner surface 36 having a radius of approximately eight (8) inches. Outer partial cylinder sleeve 34 has a center of curvature which is coextensive with the center of curvature C of the inner partial cylinder surface 26. The opposite end of outer partial cylinder sleeve 34 merges into the first outer connector lug 29 as best shown in FIGS. 2 and 16.

Figure 5:
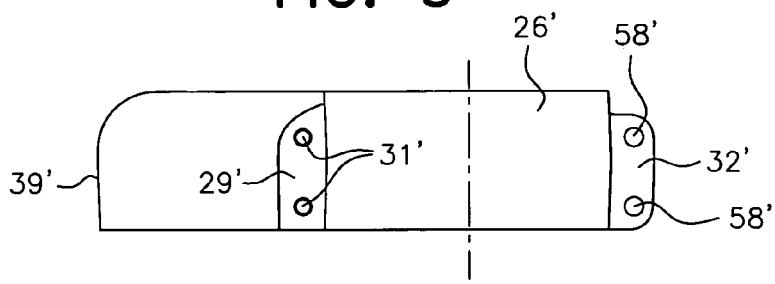
FIG. 5 is a rear elevation view of the second half-portion housing component of FIG. 3.
Figure 3:
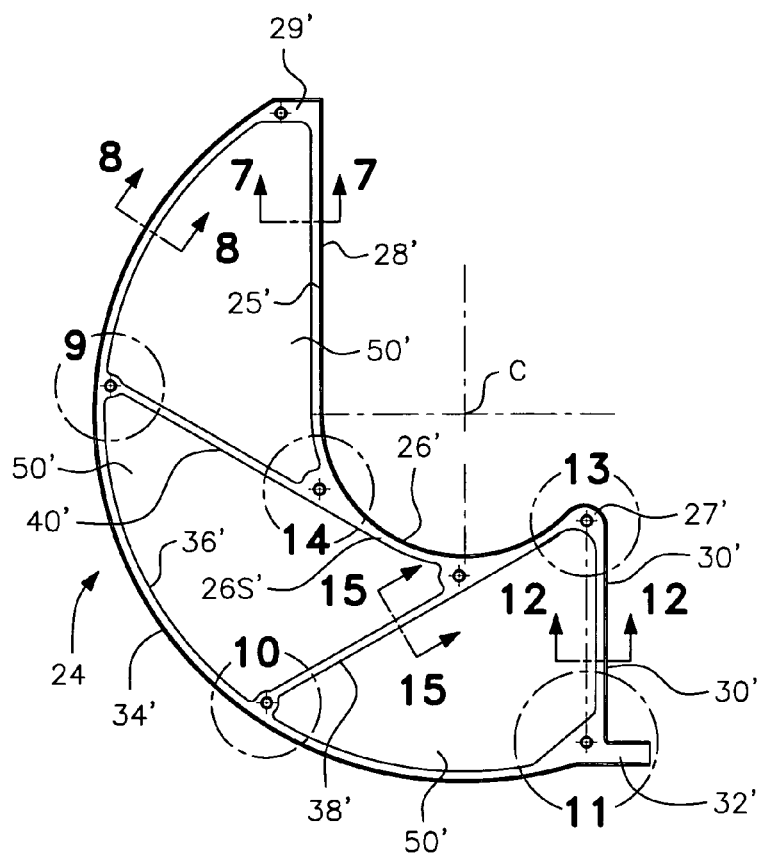
FIG. 3 is a top plan view of a second half-portion housing component of the first harmonic mode vibration damper apparatus.
Figure 6:
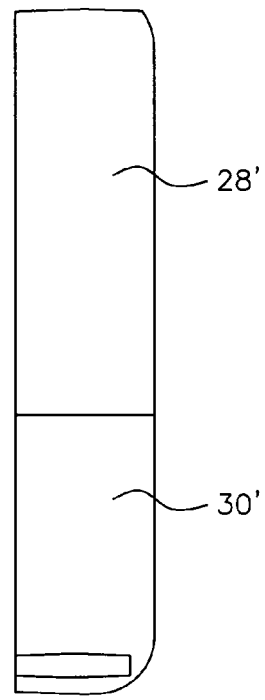
FIG. 6 is a right side elevation view of the second half-portion housing component of FIG. 3.
Figure 4:
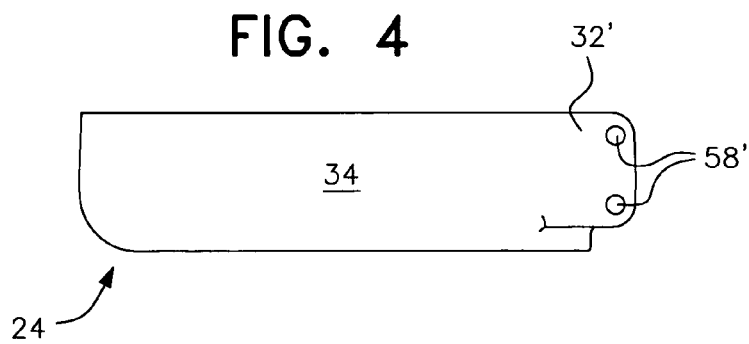
FIG. 4 is a front elevation view of the second half-portion housing component of FIG. 3.
Figure 11:
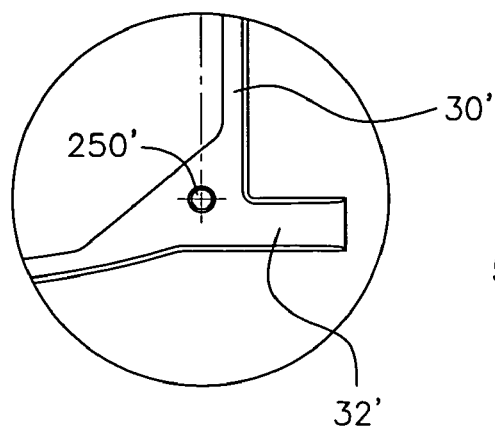
FIG. 11 is an enlarged view of the encircled portion 11 in FIG. 3.
Figure 12:
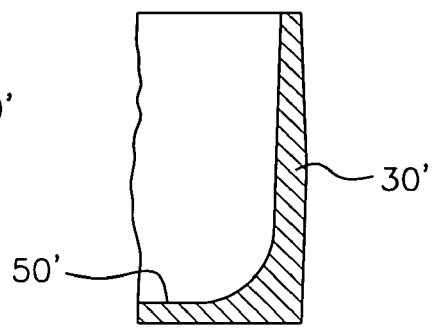
FIG. 12 is a section view taken along line 12—12 of FIG. 3.
Figure 13:
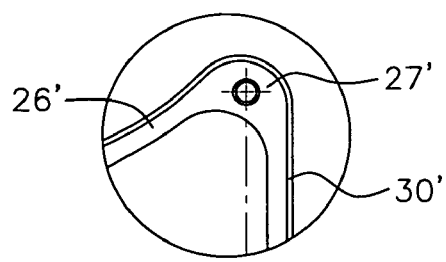
FIG. 13 is an enlarged view of the encircled portion 13 in FIG. 3.
Figure 14:
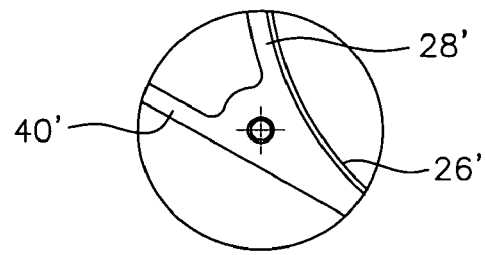
FIG. 14 is an enlarged view of the encircled portion 14 in FIG. 3.
Figure 15:
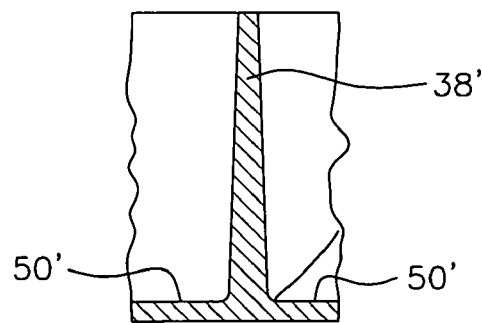
FIG. 15 is a section view taken along line 15—15 of FIG. 3.

Second housing component half-portion 24 has a vertical height of three (3) inches and includes an inner partial cylinder sleeve surface 26' (FIG. 3) of an inner partial cylinder sleeve 26S' having a radius of three (3) inches. Surface 26S' blends into an inner planar surface 28' of a first planar panel plate 25' having an outer end terminating at a first outer connector lug 29' having threaded bore openings 31' as shown in FIG. 5. The opposite end of the inner partial cylinder surface 26' terminates at an inner juncture lug 27' connected to the inner end of a second planar panel plate 30'. The outer end of the second panel plate 30' terminates at a second outer connector lug 32' which has smooth bore holes 58' usable for connecting the second housing component half-portion 24 to the first outer connector lug 29 of first housing component half-portion 22. Second outer connector lug 32' is also connected to one end of an outer partial cylinder sleeve 34' having an inner surface 36' having a radius of approximately eight (8) inches. Outer partial cylinder sleeve 34' has a center of curvature coextensive with the center of curvature C of the inner partial cylinder surface 26'. The opposite end of outer partial cylinder sleeve 34' merges into connector lug portion 29' as best shown in FIG. 3.

Completion of the mounting of the assembly on the cylindrical upper end surface of the pole is effected by positioning of metal cover portions 222 and 224 on top of half-portions 22 and 24. The cover portions 222 and 224 are respectively connected to housing component half-portions 22 and 24 by metal screws S and 5' passing through apertures 223 and 223' provided in cover portions 222 and 224. Screws S and 5' are rotated into threaded bores 250 and 250' respectively provided in housing component half-portions 22 and 24 to effect complete closure of the weight retaining chambers so as to prevent damping weights 48 and 48' from escaping from their respective weight receiving chambers.

Modifications and variations of the above-described embodiments of the present invention are possible, such as different dimensions and equivalent structure as appreciated by those skilled in the art in light of the above teachings. It is therefore to be understood that, within the scope of the appended claims and their equivalents, the invention may be practiced otherwise than as specifically described.

What is claimed is:

1. A pole vibration damping assembly mountable on a vertical non-rotatable pole for damping wind induced first harmonic mode vibrations of the pole, said assembly comprising an annular housing including a horizontally oriented first housing component half-portion and a horizontally oriented second housing component half-portion horizontally aligned with the first housing component half-portion and connections connecting the first housing component half-portion to the second housing component half-portion, each housing component half-portion including an inner partial cylinder sleeve having an inner partial cylinder sleeve surface having a lower end portion, a vertical center of curvature and being dimensioned and shaped to fit in a mating manner over, and in facing contact with, an upper end portion of a vertical non-rotatable pole and having an axis approximately coextensive with the center of curvature of the pole, an outer partial cylinder sleeve positioned outwardly of the inner partial cylinder sleeve surface and having a lower end termination portion and a vertical center of curvature that is coextensive with the center of curvature of the inner partial cylinder sleeve surface, a floor panel extending between lower portions of the inner partial cylinder sleeve surface and the outer partial cylinder sleeve, a plurality of vertical partitioning panels extending vertically upward from the floor panel and extending between the inner partial cylinder sleeve and the outer partial cylinder sleeve to define non-circular damping weight receiving chambers between adjacent partitioning panels and a movable damping weight supported by the floor panel for horizontal rolling movement in each of the damping weight receiving chambers.

2. A pole vibration damping assembly as recited in claim 1, wherein the damping weights are spherical balls and the shape and dimensions of the damping weight receiving chambers are sufficient to permit rolling movement in any direction of the spherical balls in the respective damping chamber in which each spherical ball is positioned.

3. A pole vibration damping assembly as recited in claim 2, wherein the damping weights are spherical metal balls and the partitioning panels are connected to the inner partial cylinder sleeve and the outer partial cylinder sleeve.

4. A pole vibration damping assembly as recited in claim 1, wherein the damping weights are spherical lead balls.

5. A pole vibration damping assembly as recited in claim 1, wherein the partitioning panels are planar panels.

6. A pole vibration damping assembly as recited in claim 1, wherein the partitioning panels are planar panels oriented in substantially perpendicular manner relative to the floor panel.

7. A pole vibration damping assembly as recited in claim 1, wherein the damping weights are plastic coated spherical metal balls.

8. A pole vibration damping assembly as recited in claim 1, wherein the damping weights are plastic coated spherical metal balls that are coated with polyurethane.

9. A pole vibration damping assembly as recited in claim 1, wherein the first housing component half-portion and the second housing component half-portion are fixedly connected together to cooperatively encircle the pole, each housing component half-portion includes a first planar panel extending between a first end portion of the inner partial-cylinder sleeve and a connector lug comprising part of the connection on a first end portion of the outer partial-cylinder sleeve, and a second planar panel extending between a second end portion of the inner partial-cylinder sleeve and a connector lug comprising part of the connection on a second end portion of the outer partial-cylinder sleeve and threaded metal screws comprising part of the connection connecting the connector lug of the second housing component half-portion to provide a rigid housing structure.

10. A pole vibration damping assembly as recited in claim 9, wherein the damping weights are spherical metal balls.

11. A pole vibration damping assembly as recited in claim 9, wherein the damping weights are spherical lead balls.

* * * * *